United States Patent [19]

Blair

[11] 4,168,961

[45] Sep. 25, 1979

[54] METHOD OF MOLDING GLASS ELEMENTS

[75] Inventor: Gerald E. Blair, Pittsford, N.Y.

[73] Assignee: Eastman Kodak Company, Rochester, N.Y.

[21] Appl. No.: 762,897

[22] Filed: Jan. 26, 1977

Related U.S. Application Data

[63] Continuation of Ser. No. 609,329, Sep. 2, 1975, abandoned.

[51] Int. Cl.² .............................................. C03B 11/08
[52] U.S. Cl. .................................... 65/66; 65/374 R; 428/409
[58] Field of Search ............ 65/37, 32, 69, 66, 374 R, 65/68, 24, 26; 428/409

[56] References Cited

U.S. PATENT DOCUMENTS 3,833,347  9/1974  Angle et al. .................. 65/374 R X Primary Examiner—Arthur D. Kellogg
Attorney, Agent, or Firm—John A. Morrow

[57] ABSTRACT

A method of molding glass elements requiring no further preparatory operations such as grinding or polishing before use wherein a portion of glass is heat-softened and subjected to pressure in a mold having molding surfaces formed of a material comprising a mixture of silicon carbide (SiC) and carbon.

13 Claims, 4 Drawing Figures

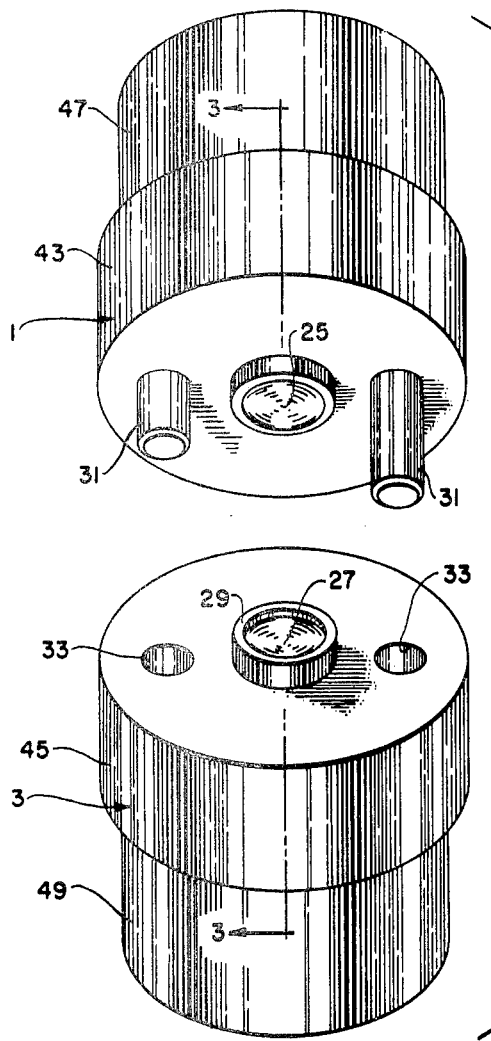
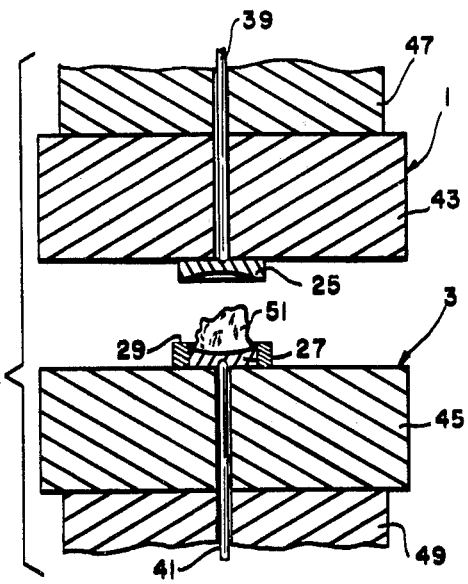
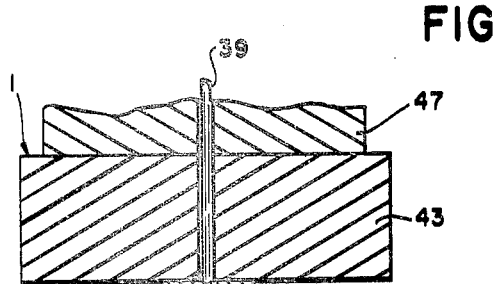
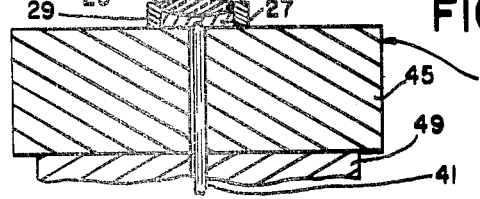
FIG. 2
FIG. 3a
FIG. 3b

METHOD OF MOLDING GLASS ELEMENTS

This is a continuation of application Ser. No. 609,329, filed Sept. 2, 1975 now abandoned.

CROSS REFERENCE TO RELATED APPLICATIONS

Reference is made to commonly assigned copending U.S. application Ser. No. 762,898, filed on even date herewith for a Method of Molding Glass Elements in the names of G. E. Blair, John J. Meyers, John H. Shafer and Frank T. J. Smith that application being a continuation application of Ser. No. 609,328, filed Sept. 2, 1975 both now abandoned.

BACKGROUND OF THE INVENTION

1. Field of the Invention

This invention relates generally to the manufacture of glass optical elements, and, in particular, to methods of molding glass optical elements such as lenses and prisms.

2. Description of the Prior Art

In manufacturing glass elements, it is generally necessary that the glass element meet certain criteria in order to be suitable for its intended use. This is particularly true for optical elements. For instance, in selecting a lens intended for use in photographic apparatus where good image-forming qualities are necessary, the nature of the lens surface must be considered. The characteristics of a surface which are important in this regard are known in the art as surface quality and surface accuracy. Surface quality is related to the occurrence of defects such as scratches, digs, pits, voids, "orange peel", etc. on the surface of an element. An element is said to be of "high surface quality" if the number of such defects is sufficiently low so that the element is suitable for its intended use. For instance, in the case of a lens to be used in photographic apparatus, the number of such defects must be low enough so that image forming qualities of the lens are not impaired. It is understood that the number of such defects which can be tolerated depends on the particular element being considered and its intended use.

Surface accuracy, which is usually specified in terms of the wave length of light of a specific color, refers to the dimensional characteristics of the surface, i.e. the value and uniformity of the radius of curvature of the surface. The surface accuracy is generally determined by an interferometric comparison of a surface of the element with a test plate gauge, by counting the number of Newton's rings, and by examining the regularity of the rings. The surface accuracy of an element is often referred to as its fit. The fit of an element is expressed in terms of its power (the number of Newton's rings which are counted) and its irregularity (the difference between the number of rings when counted in perpendicular directions across the fringe pattern). The lower the values of the power and irregularity, the better the lens, or in other words, the higher its accuracy. Therefore, "high surface accuracy", or "precise fit" refers to a surface which has dimensional characteristics that are extremely close to their design value and are very uniform. For instance, the surface accuracy of a lens to be used in a photographic apparatus is frequently considered high when it has a power of less than six rings and an irregularity of less than three rings.

The manufacture of glass optical elements has conventionally required a series of complex and expensive steps, including molding, grinding, and polishing operations. For instance, in the conventional manufacture of a glass lens, a rough molded glass lens blank is first made by heating a chunk of glass to a softened state and pressing the glass to the desired shape in a metal mold. In some cases, the glass may adhere to the molding surfaces. To prevent this adherence, the mold temperature may be reduced below the glass temperature during pressing. However, this technique may produce an irregular surface called "chill wrinkle", when the hotter glass comes into contact with the cooler mold surface. Another technique is to heat the chunk of glass on a hearth plate prior to molding. A thin layer of a parting agent may be used to prevent the glass from sticking to the hearth plate. The parting agent may become embedded in the rough molded glass surface. When formed with these techniques, a rough molded lens blank does not possess the high surface quality and high surface accuracy necessary for an image-forming lens. Hence, it is necessary to mold a lens blank which is larger than the intended lens element to allow for the removal of material during the subsequent grinding and polishing operations needed to render the lens suitable for use.

Spherical lens surfaces can be generated by rotating the lens blank in a vacuum chuck and grinding the lens blank with a rotating annular tool whose axis is at an angle to the chuck axis. The tool has an abrasive surface including diamond chips. The geometry of this arrangement causes a sphere to be generated wherein the radius is determined by the angle between the axes of the chuck and of the rotating generating tool, and by the effective diameter of the tool. The thickness is governed by the distance the work is advanced into the tool. The surface of the lens blank may be refined further by grinding operations performed with loose abrasive in a water slurry and cast iron grinding tools.

After the grinding operation has been concluded, the lens element can be polished by a process similar to the grinding process. The polishing tool is lined with a layer of pitch and the polishing compound is a slurry of water and rouge (iron-oxide) or cerium oxide. Polishing is continued until substantially all of the grinding pits and scratches are removed from the surface of the lens. Then, the lens shape is checked and corrections are made to assure the proper shaping of the lens.

Following the polishing operation, the lens is centered by grinding the rim of the lens, so that its mechanical axis (defined by the edge of the lens) coincides with the optical axis (the line between the centers of curvature of the two lens surfaces). Lens centering can be done either by known visual methods which are very accurate or by more economical mechanical methods.

It is considerably more complicated to produce non-spherical lens surfaces. The manufacture of precise aspheric lens surfaces requires a combination of exacting measurement and skilled hand correction. One method involves the difficult operation of working a lens blank between centers on a lathe. Aspheric lenses can be made in small production quantities, where high precision is not required, by means of a cam guided grinding rig for generating the lens surface. Thereafter, the troublesome operations of grinding and polishing the aspheric lens surface are performed, the problem being that these operations can easily destroy the basic shape of the lens. Where precise aspheric surfaces are required, it is necessary to make grinding adjustments manually with the concomitant requirements of great delicacy and finesse, the shortcomings of which are apparent.

The expense of existing methods for fabricating glass lenses has led to the limited use of plastic lenses. Plastic has several advantages as a lens material, namely, it is light, shatterproof, and moldable. However, presently available plastics which are practical for use as lens materials such as polystyrene, polycyclohexyl methacrylate, and polymethyl methacrylate, are relatively soft and scratch easily. Moreover, the latter plastic tends to be frequently hazy and sometimes yellowish. Also, plastics usually soften within the range of 60° to 80° C. and their indices of refraction may change in time. Most plastics absorb water and are subject to dimensional change, the latter characteristic being due to their tendency to cold flow under pressure and to their high thermal expansion coefficient which is almost ten times that of glass. In addition, the high thermal expansion of the plastics causes changes in the indices of refraction of the plastics to an extent ten times that of glass, thus severely hampering the optical performance of the lens.

Thus, glass is clearly a more desirable lens material than plastic, but plastic lenses are considerably easier and cheaper to manufacture than glass lenses because they can be mass produced by molding. However, conventional molding methods have not been found suitable for directly making glass lenses that do not require further preparatory operations. One reason for this is the tendency of heated glass to adhere to some materials and for the glass to remain adhered to the materials after cooling. Thus, one of the prerequisites for producing a suitable lens directly from a mold is that the glass being molded does not permanently adhere to the molding surface. Non-adherence alone, however, is not sufficient, because it has been found that glass will replicate the surface of materials to which the glass does not ahere. For example, glass molded in metal dies has been found to reproduce the grain structure of the metal molding surfaces on the surface of the glass, and such lenses are unsuitable for optical uses without further operations to improve the quality and accuracy of their surfaces. U.S. Pat. No. 3,244,497 discloses the use of extremely thin coatings of refractory materials (approximately half wavelength) to protect a mirror finish metal molding surface and act as a parting agent in a glass molding structure for producing ophthalmic lenses. But, even though surface characteristic tolerances for most ophthalmic lenses are not as stringent as for many optical elements (e.g. 100 ring power may be acceptable), it is nevertheless still necessary to perform additional polishing operations on lens blanks molded in the molding structure disclosed in U.S. Pat. No. 3,244,497 in order to produce even an ophthalmic lens suitable for use. Thus, although it is apparent that in order to directly mold glass lenses the mold surfaces must be of high quality and high accuracy and must not be adhered to by glass, it is equally clear that meeting these requirements does not quarantee that the lens produced will not require further preparatory operations, such as polishing, in order to be rendered suitable for use. The failure of known molding methods to directly produce glass optical elements suitable for use by molding alone has necessitated continued reliance on the time consuming and expensive grinding and polishing operations described above.

Recently, glasslike carbon materials have been developed which have found many applications in the electronics and metallurgy fields. It has been discovered, as disclosed in commonly assigned U.S. Pat. No. 3,900,328 issued Aug. 19, 1975 that these glasslike carbon materials can be used as a molding surface in a mold cavity for directly producing glass lenses which require no subsequent grinding and polishing operations, wherein a heat-softened glass is placed in the mold cavity and pressed to form a lens having a shape generally determined by the shape of the mold cavity. An improved method of molding glass lenses employing these glasslike carbon materials is disclosed in U.S. Pat. No. 3,833,347, issued Sept. 3, 1974, a continuation of U.S. application Ser. No. 93,351, filed Nov. 27, 1970, wherein the portion of glass to be molded is heated while it is in proximity to or in contact with the glasslike carbon molding surface. Another improved method of molding glass into optical elements employing glasslike carbon molding surfaces is disclosed in U.S. Pat. No. 3,844,755, issued Oct. 29, 1974, wherein optical glass in a glasslike carbon transfer chamber is heat-softened and subjected to pressure, thereby transferring the glass through a sprue and into a mold cavity having molding surfaces of glass-like carbon.

While the use of glasslike carbon represents a significant breakthrough in the art of lens fabrication, glasslike carbon possesses several properties which make it a less than ideal molding-surface material. Glasslike carbon is subject to oxidation, is structurally weak, is subject to surface scratching, has a low modulus of elasticity, has low fracture and impact strength, and has low thermal conductivity. All of these characteristics are undesirable in a glass molding material, and tend to limit the usefulness of glasslike carbon molding surfaces. It would be desirable to find other mold materials possessing the favorable glass molding properties of glasslike carbon, but materials which would at the same time possess improved structural and thermal properties.

SUMMARY OF THE INVENTION

It has now been found that glass elements having high surface quality and high surface accuracy, and therefore requiring no further preparatory operations such as grinding or polishing, can be prepared by molding glass against a molding surface formed of a material comprising a mixture of silicon carbide and carbon. The molding surface can be formed from a solid body of the material or from a layer of the material on a substrate. In either case, the material must be of sufficient thickness that the molding characteristics of the molding surface are exclusively attributable to the mixture of silicon carbide and carbon; preferably such a layer should be at least 10 microns thick.

In one embodiment of the present invention, the molding process comprises the steps of placing a portion of heat-softened glass in a mold having molding surfaces formed from a material such as described above, pressing the glass against the molding surfaces until the glass conforms to the shape of the mold, cooling the glass and mold, and removing the glass element from the mold. In another embodiment of the invention, the molding process comprises the steps of placing a portion of glass in a mold having molding surfaces formed of the above-mentioned material, heating the mold to soften the glass, pressing the glass against the molding surfaces until the glass conforms to the shape of the mold, cooling the glass and mold, and removing the glass element from the mold. In yet a third embodiment of the present invention, the molding process comprises the steps of placing a portion of glass in a transfer chamber having walls formed of the above-mentioned material, heating the chamber to soften the glass, applying pressure so that the heat-softened glass is transferred through sprues into mold cavities defined by molding surfaces formed of the above-mentioned material until the glass conforms to the shape of the mold cavities, cooling the glass and molding surfaces, and removing the glass element from the mold.

BRIEF DESCRIPTION OF THE DRAWINGS

In the preferred embodiments of the invention described below, reference is made to the accompanying drawings, in which:

FIG. 2 is a detailed view of a mold employed in the molding apparatus shown in FIG. 1;

FIGS. 3A and 3B are partial cross-sectional views, taken through the line 3—3 in FIG. 2, during different stages of the operation of the molding apparatus of FIG. 1.

DETAILED DESCRIPTION OF THE PREFERRED EMBODIMENTS

Figure 1:
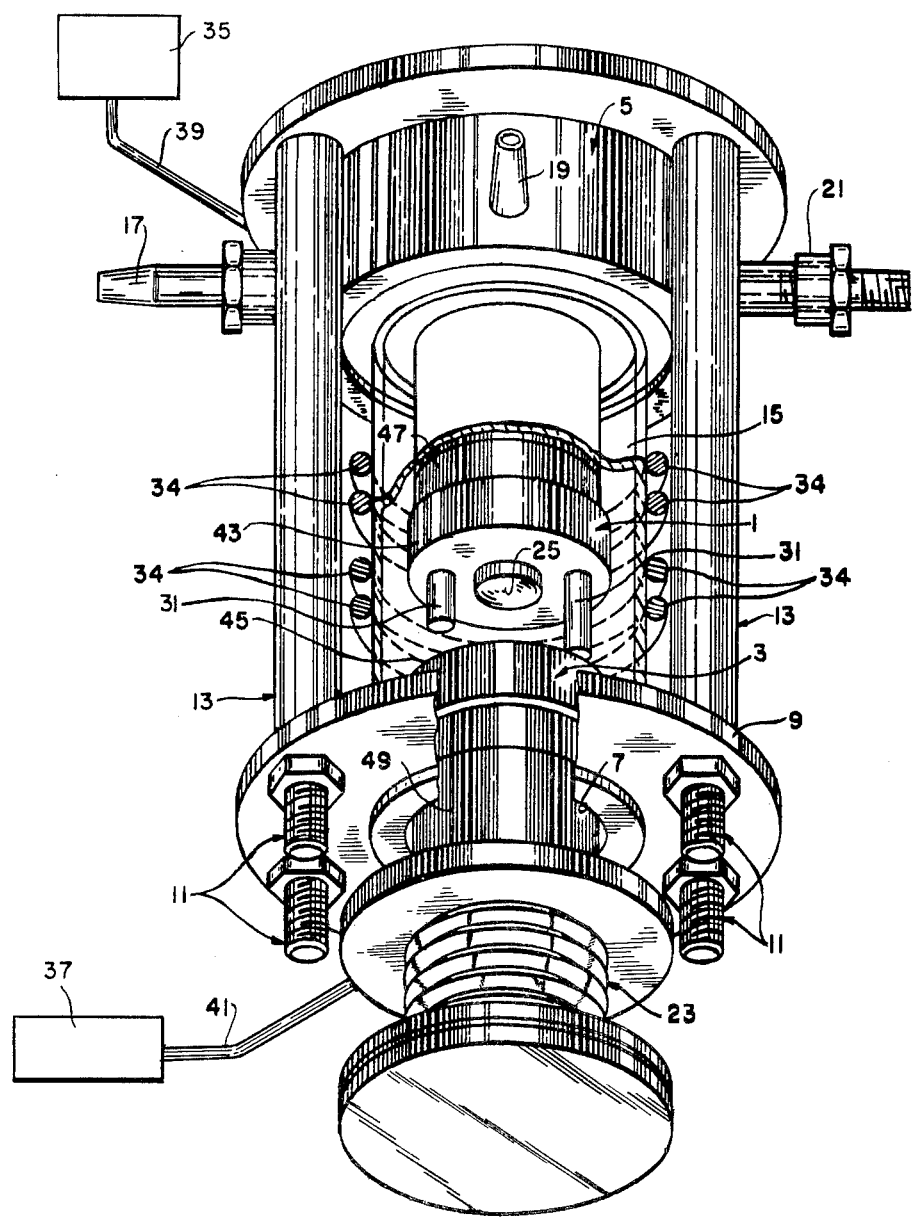
FIG. 1 is a partially cut away perspective view of a molding apparatus for producing glass elements according to the invention.

The present invention provides a practicable method for molding glass elements having high surface quality and high surface accuracy, such as, for instance, glass lenses possessing good image-forming qualities for use in photographic apparatus. The molding process employs a molding surface having high surface quality and high surface accuracy formed of a material comprising a mixture of silicon carbide and carbon. The material in which the molding surface is formed should be of sufficient thickness that the molding characteristics of the molding surface are exclusively attributable to the material in order to produce a glass element having the desired high surface quality and high surface accuracy. The molding surface can be formed in a solid body of the material or from a layer of the material which is deposited on a suitable substrate by methods to be described below. In the case of a layer deposited on a substrate, it is necessary that the layer be of sufficient thickness so that, even after removal of some of the layer during finishing, the remaining portion of the layer is still sufficiently thick that the surface characteristics of the molding surface are exclusively attributable to the layer, with no interaction between the substrate and the molded glass. Preferably, the layer should be at least 10 microns thick.

The present invention makes use of a mixture of silicon carbide and carbon as a molding surface material because it has been found that a mixture of these components possesses properties which make it an excellent material for such use. Like the glasslike carbons of the prior art, such a mixture exhibits minimal chemical activity to glass at high temperatures, is impermeable to gases, water vapor and liquids, and is not permanently adhered to by heat-softened glass. In contrast to glasslike carbon materials, however, such a mixture also possesses, to an extent determined in part by the relative proportions of the components, the additional favorable characteristics of being more resistant to oxidation, having improved fracture and impact strength at high temperatures, having improved physical hardness (being therefore less subject to scratching), and having higher thermal conductivity (allowing for more rapid thermal cycling).

The mixture of silicon carbide and carbon useful in the practice of the invention can be prepared by chemical vapor deposition, either as a solid piece or as a layer on a suitable substrate. A mixture of silicon carbide and carbon produced by this method possess the advantageous properties of lacking internal voids and having the capability of being polished to a continuous, highly specular surface. Further description of one method for producing such a mixture of silicon carbide and carbon may be found in Kaae & Gulden, "Structure and Mechanical Properties of Codeposited Pyrolytic C-SiC Alloys," Journal of the American Ceramic Society, pages 605–609, 54, No. 12, 1971.

Several techniques may be used to produce a molding surface useful in the practice of the invention. If the material is in a solid piece, the piece can be ground and polished to form a molding surface that is comparable to the shape and finish desired in the molded elements. A rough shape could have been pre-formed in the solid piece during its formation, thereby minimizing the grinding operation. A second technique involves generating, grinding, and polishing the mold form directly from a deposit of mixture of silicon carbide and carbon. The deposit must be thick enough to provide a sufficient base for support and mounting, allowing for material to be cut away in forming the desired curve. Another technique involves forming a relatively thin deposit of a mixture of silicon carbide and carbon on a suitable pre-curved substrate, such as graphite, molybdenum, or hot pressed silicon carbide. However, the deposit of the mixture of silicon carbide and carbon must be thick enough so that even after grinding and polishing to the desired specifications, the molding surface characteristics are exclusively attributable to the deposited layer. A fourth technique for forming a suitable molding surface involves the use of an inverse mold form surface as a base for deposit of a mixture of silicon carbide and carbon. In this technique, a parting or release agent is first applied to the inverse mold form, followed by the deposition of a relatively thick layer of the mixture. The resulting mold surface separates at the parting layer from the inverse mold form and can be used with little or no surface corrections. Again, the layer must be sufficiently thick so that the molding characteristics are exclusively attributable to the deposited layer of the mixture. The molds so produced are preferably installed as inserts on sturdy support members in order to add strength and durability to the molds.

The method of molding glass elements essentially requires that heat-softened glass be pressed against a molding surface formed in a material comprising a mixture of silicon carbide and carbon produced as described above until the glass conforms to the shape of the molding surface; the glass is then cooled to below its transformation temperature while still being pressed against the molding surface; and then the glass element is removed from the molding surface.

In one embodiment of the present invention, a method of molding glass elements according to the invention could utilize a molding apparatus such as that shown in FIG. 1, which apparatus is particularly adapted to the molding of glass lenses. The apparatus comprises a stationary upper mold assembly 1 and a lower mold assembly 3. Upper mold assembly 1 is fixed in an upper mount 5 whereas lower mold assembly 3 is vertically movable through a circular aperture 7 provided in a base plate 9. Upper mount 5 and base plate 9 are connected by a set of bolts 11 which extend through a set of tubes 13. A molding chamber is defined by a borosilicate glass (such as Pyrex) envelope 15 which has a cylindrical shape and which encloses the molding space located between the upper and lower mold assemblies. Alternatively, the envelope could be made of metal. A port 17 (which can be closed by a valve which is not shown) is connected to the molding chamber defined by envelope 15 for exhausting gas from the chamber; a second port 19 is similarly connected to the molding chamber for admitting a controlled atmosphere, and a third port 21 is also connected to the molding chamber and serves as an exhaust for the controlled atmosphere, there being provided a check valve (not shown) for regulating the exhaust to thereby control the pressure of the gas in the molding chamber. A bellows 23 is disposed beneath lower mold assembly 3, and its interior is connected to the molding chamber defined by envelope 15. The purpose of the bellows is to permit movement of lower mold assembly 3 upwardly while maintaining atmosphere control in the molding chamber.

Referring specifically to FIG. 2, upper mold assembly 1 has disposed on the lower face thereof a mold member comprising an insert 25 which is formed of a material comprising a mixture of silicon carbide and carbon and is configured to provide the proper shape of the part of the lens to be produced thereby. A similar mold member in the form of an insert 27 and made of the same material as insert 25 is disposed opposite to insert 25 and is mounted on the upper face of lower mold assembly 3. The opposing surfaces of the two mold inserts 25 and 27 cooperate to form the opposite faces of the lens to be produced by the mold. Preferably, a ring 29, which may be though not necessarily is made of the same material as inserts 25 and 27, is disposed around insert 27 for adding the necessary thickness to the lens to be reproduced. Ring 29 may be eliminated for open-die molding. The mold forming surfaces are thus made of a material comprising a mixture of silicon carbide and carbon, they are finished to have a high surface accuracy and shaped to produce the intended lens, and they are polished to a high quality comparable to that of the intended lens. Lower mold assembly 3 is displaceable towards upper mold assembly 1, and its path is accurately maintained by a pair of guide pins 31 which travel in appropriate inserts 33 extending into lower mold assembly 3. The pins and inserts can advantageously be made of aluminum oxide.

A heating coil 34 is wrapped around envelope 15 so as to surround the molding area. When the coils are activated, ring 29 and inserts 25 and 27, as well as a pair of supports 43 and 45 on which the respective inserts 25 and 27 are mounted, are heated by induction. Heat is transmitted by conduction from supports 43 and 45, which act as heat reservoirs, to inserts 25 and 27. While heating coil 34 is shown outside of envelope 15, this is done for ease of assembly. Coil 34 could be positioned inside envelope 15 and could take any form known in the art that will provide sufficient heat to permit molding of the optical glass in the molding chamber. Supports 43 and 45 may be made of graphite, molybdenum or other similar material.

The mold temperature is controlled by a pair of thermocouples 35 and 37, which are connected to inserts 25 and 27 by means of appropriate leads 39 and 41 extending through the two mold assemblies, as shown in FIGS. 3A and 3B. In order to confine the generated heat to the molding vicinity, a pair of pyrolytic graphite insulators 47 and 49 are disposed on the ends of supports 43 and 45, opposite the inserts 25 and 27. The pyrolytic graphite conducts heat in the horizontal direction (with reference to the drawings) and is non-conductive in the vertical direction. Lower mold assembly 3 can be displayed by pneumatic, hydraulic, mechanical or any other appropriate means (not shown) for producing the desired movement.

The method of molding glass lenses to be described below requires a mold having molding surfaces which are configured and finished to yield lenses having prescribed shapes and high surface qualtities. It is to be understood, therefore, that inserts 25 and 27 are dimensioned and polished to the accuracy and quality of the lenses to be manufactured. While the molds have preferably been illustrated as inserts on relatively sturdy support members, the support members are present for heat transfer and to add strength and durability to the molding apparatus. Molding of glass elements such as optical lenses can also be achieved in a molding apparatus which does not include supports.

It has been found that glass elements molded against molding surfaces having high surface quality and high surface accuracy formed in a material comprising a mixture of silicon carbide and carbon of sufficient thickness as described hereinbefore will also possess high surface quality and high surface accuracy. A suitable molding surface can be prepared by grinding and polishing the material in the form of a layer or solid body until it meets the surface tolerance limits established for the final glass element. As indicated previously, the "high surface accuracy" required of lenses of the quality used in photographic apparatus should be within six Newton rings of power and three rings of irregularity. Surface accuracy within these tolerances has been achieved in the walls defining the cavities of the molds made of a material comprising a mixture of silicon carbide and carbon. Likewise, these same mold walls must have "high surface quality" as is required of the finished lenses, which renders the walls substantially devoid of scratches, digs, pits and the like, and such surface quality has also been at least partially achieved in the practice of this invention. During these grinding and polishing operations, the mold cavities may also be configured to yield a glass element of a predetermined shape with a molded mounting shoulder and the ridges and grooves associated with mounting seats. The walls defining the cavities are shaped much like the predetermined shape of the lens and lens shoulder to be produced by the mold, but provisions may have to be made for dimensional changes occurring in the molded glass due to temperature changes and the like during and after the molding process. Thus, the molded element will be ready for final assembly without subsequent grinding and polishing.

According to a preferred method of molding optical elements by this invention, a quantity of glass is placed within the molding chamber. It may be set in contact with insert 27, as shown in FIG. 3A or provision may be made to hold the glass out of contact with inserts 25 and 27 until heated. The glass must be shaped to fit within the molding chamber but need not be preformed to a different volume and shape for different lens designs, although preforming is preferable. Preferably, the surface of the glass slug is fired or machine polished to a high quality, but this may not be necessary in all cases.

The mechanical means are then actuated to move lower mold assembly 3 upwardlly to bring the glass, ring 29 and insert 27 into the molding chamber and into proximity with insert 25. Bellows 23 will be compressed while maintaining a vacuum seal. The atmosphere within the molding chamber may now be evacuated through port 17. Simultaneously, heat is introduced into the molding chamber by means of coils 34 to outgas the molding chamber, the surfaces of ring 29 and inserts 25 and 27 and the glass. The desired controlled atmosphere, preferably nitrogen, may now be introduced into the molding chamber through port 19, with pressure control by port 21. Heating coils 34 are again actuated causing continued heating of supports 43 and 45, ring 29, inserts 25 and 27 and the glass in the molding chamber until the desired molding temperature is reached. The temperature of inserts 25 and 27 may be monitored by thermocouples as shown, by optical pyrometry equipment or by other suitable means. When the desired temperature has been attained and stabilized, the glass, ring 29 and inserts 25 and 27 will be at substantially although not necessarily exactly the same temperature. A load is now applied to lower mold assembly 3, bringing ring 29 into contact with insert 25 and forming a molding cavity with inserts 25 and 27 and ring 29. After a suitable molding time, the temperature of the mold will be reduced gradually to bring the temperature below the glass transformation point while still maintaining a load on the glass, to minimize distortion of glass as the temperature is reduced. After the glass transformation temperature has been reached, the load may be removed from lower mold assembly 3.

A specific example of the practice of the invention using an apparatus as described above is as follows:

inserts 25 and 27 are formed by coating a substrate in the form of a hollow graphite ball having a diameter of 0.850 inches and a wall thickness of 2 mm with a 0.5 mm thick layer of a material comprising a mixture of silicon carbide and carbon, the silicon carbide being approximately 11% by weight; cutting the coated substrate in half, to produce inserts 25 and 27; performing any necessary polishing to secure a specular surface having high surface quality and high surface accuracy; and mounting inserts 25 and 27 in the molding apparatus;

with lower mold assembly 3 in its downward position, a portion of extra dense flint optical glass is placed on insert 27, after which the mechanical means are actuated to move lower mold assembly 3 in an upwardly direction so as to enter the molding chamber and move into proximity with upper mold assembly 1;

the molding chamber is now evacuated by means of port 17 to approximately 200 microns and simultaneously, the surface of the glass, ring 29 and inserts 25 and 27 are outgassed at a temperature between about 400° F. and 570° F. by means of heating coils 34;

port 17 is now closed and a controlled atmosphere of nitrogen gas is introduced into the molding chamber through port 19, with a slight over pressure maintained by means of port 21;

power to coils 34 is adjusted to raise the temperature within the molding chamber until the glass is softened sufficiently to mold and the temperature is maintained for a period of about 1.5 minutes; a temperature of about 1050° F. for extra dense flint optical glass is sufficient, but the necessary temperature will vary depending on the nature of the glass being molded;

a load is now applied to lower mold assembly 3, thereby pressing the heat-softened glass within the molding chamber between ring 29 and inserts 25 and 27 as shown in FIG. 3B, the load applied being approximately 130 pounds per square inch and being applied for about 10 seconds, with a higher load requiring a shorter loading time;

heating of the mold members is now terminated while a load is maintained on lower mold assembly 3 until a temperature below the transformation temperature of the glass being molded is reached;

the load on lower mold assembly 3 can now be removed and the temperature in the mold chamber reduced further to about 400° F., thereby minimizing the possibility of oxidation of ring 29, inserts 25 and 27 and supports 43 and 45; and the mold may now be opened by downward movement of lower mold assembly 3 and the resulting molded glass element may be removed from insert 27.

In another embodiment of the present invention adapted to the production of glass lenses, a molding apparatus is employed which utilizes molding surfaces formed of a mixture of silicon carbide and carbon as previously described, but which is otherwise similar to the apparatus disclosed in U.S. application Ser. No. 340,510, filed Mar. 12, 1973, a continuation of U.S. application Ser. No. 93,336, filed Nov. 27, 1970, and that portion of the specification which describes the molding apparatus is hereby incorporated by reference. Using this apparatus, the method comprises placing a portion of glass which has been heat-softened outside of the mold cavity into a mold cavity defined by the material comprising a mixture of silicon carbide and carbon; compressing the glass until the glass conforms to the shape of the mold cavity; cooling the glass and mold; and removing the glass lens, which is suitable for use without further preparatory operations.

In a third embodiment of the invention, a molding apparatus is employed which utilizes molding surfaces formed of a material comprising a mixture of silicon carbide and carbon as above-described, but which is otherwise similar to the apparatus disclosed in U.S. Pat. No. 3,844,755, issued Oct. 29, 1974, and that portion of the specification which describes the molding apparatus is hereby incorporated by reference. An example of using this apparatus would be the molding of a glass lens by a series of steps comprising: placing an unheated portion of glass in a transfer chamber defined by molding surfaces formed in a material comprising a mixture of silicon carbide and carbon; heating the mold members, transfer chamber and glass to soften the glass; forcing the heated glass from the transfer chamber through sprues into mold cavities defined by molding surfaces formed in a material comprising a mixture of silicon carbide and carbon until the glass conforms to the shape of the mold cavity; cooling the glass and mold members; and removing the glass lens from the mold.

The invention has been described in detail with particular reference to preferred embodiments thereof but it will be understood that variations and modifications can be effected within the spirit and scope of the invention. In particular, it should be noted that the apparatus shown is only exemplary of molding apparatus for operation of the present invention and other types of molding apparatus in which different elements may be moved to define a mold cavity may be utilized for practice of this invention. Moreover, the specific example of a molding method is also only exemplary of many molding methods which can be utilized for the practice of this invention, with selection of the molding parameters, such as cycle times, loads and temperatures, being dependent upon many factors, including but not limited to the type of glass being molded as well as the prescribed design of the element which is to be molded. Finally, it should be possible to select molding parameters which would permit the molding of plastics into finished optical elements.

I claim:

1. A method of molding a finished optical surface on a glass lens which comprises pressing heat-softened glass against a molding surface formed from a material consisting of a mixture, the essential ingredients of which are silicon carbide and carbon, each being present in more than a trace amount.

2. A method as in claim 1 wherein the material is at least 10 microns thick.

3. A method of molding a finished optical surface on a glass lens which comprises pressing heat-softened glass against a molding surface formed from a material consisting of substantial proportions of silicon carbide and carbon, the material being of sufficient thickness that the molding characteristics of the molding surface are exclusively attributable to the material and the material having been finished to provide a molding surface which has a high surface quality and a high surface accuracy.

4. A method as in claim 3 wherein the material is at least 10 microns thick.

5. A method of molding a finished optical surface on a glass lens comprising the steps of:
    forming a molding surface of high surface quality and accuracy and of a configuration complementary to the desired lens surface configuration, said molding surface being a mixture of substantial proportions of each of silicon carbide and carbon and being of sufficient thickness that the molding characteristics of the molding surface are exclusively attributable to said mixture; and
    bringing heat-softened glass and the molding surface together with sufficient force to conform the glass to the configuration of the molding surface.

6. A method of molding a finished optical surface on a glass lens consisting of the steps of:
    forming a molding surface of high surface quality and accurate configuration, from a material consisting of a mixture, the essential ingredients of which are silicon carbide and carbon, each being present in more than a trace amount;
    heating the glass and molding surface;
    pressing the glass against the molding surface;
    cooling the glass and molding surface; and
    removing the molded glass.

7. A method as in claim 6 wherein the material is at least 10 microns thick.

8. A mold for producing glass lenses having a finished optical surface, said mold including a molding surface formed from a material consisting of substantial proportions of silicon carbide and carbon.

9. A mold as in claim 8 wherein the material is at least 10 microns thick.

10. A mold for producing glass lenses having finished optical surfaces, said mold including a surface formed from a material consisting of substantial proportions of silicon carbide and carbon, the surface being finished to provide a molding surface which has a high surface quality and high surface accuracy and the material being of sufficient thickness that the molding characteristics of the molding surface are exclusively attributable to the material.

11. A mold as in claim 10 wherein the material forming the molding surface is at least 10 microns thick.

12. A method of molding a finished optical surface on a glass lens comprising the steps of:
    providing a molding surface formed from a codeposited material consisting essentially of more than trace amounts of each of silicon carbide and carbon; and
    pressing heat-softened glass and the molding surface into pressure contact with sufficient force to conform the glass to the molding surface.

13. A method of molding a finished optical surface on a glass lens which comprises bringing into pressure contact heat-softened glass and a molding surface formed from a material essentially comprising more than trace amounts of each of silicon carbide and carbon, said material being at least 10 microns thick.

* * * * *